United States Patent
Oyama

(10) Patent No.: US 12,502,914 B2
(45) Date of Patent: Dec. 23, 2025

(54) TIRE

(71) Applicant: Toyo Tire Corporation, Hyogo (JP)

(72) Inventor: Itsuki Oyama, Hyogo (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 18/954,815

(22) Filed: Nov. 21, 2024

(65) Prior Publication Data

US 2025/0187379 A1     Jun. 12, 2025

(30) Foreign Application Priority Data

Dec. 7, 2023   (JP) .................................. 2023-207197

(51) Int. Cl.
    B60C 13/00             (2006.01)

(52) U.S. Cl.
    CPC .................................. B60C 13/001 (2013.01)

(58) Field of Classification Search
    CPC .............................. B60C 13/001; B60C 13/02
    See application file for complete search history.

(56) References Cited

U.S. PATENT DOCUMENTS

| 2009/0218019 A1* | 9/2009 | Paturle ................... B29C 33/424 |
| | | 428/88 |
| 2010/0170609 A1* | 7/2010 | Landers ................. B60C 13/001 |
| | | 152/523 |
| 2012/0227879 A1* | 9/2012 | Muhlhoff ............. B23K 26/355 |
| | | 152/151 |
| 2013/0126063 A1* | 5/2013 | Landers ................. B60C 13/001 |
| | | 428/141 |
| 2016/0016439 A1* | 1/2016 | Miyazono ............... B29C 35/02 |
| | | 152/209.1 |
| 2025/0121633 A1* | 4/2025 | Kotecky ................. B29D 30/72 |

FOREIGN PATENT DOCUMENTS

| DE | 102014203426 A1 * | 8/2015 | ........... B60C 13/002 |
| EP | 1063071 A2 * | 12/2000 | ............. B08B 17/06 |
| EP | 4177083 A1 | 5/2023 | |
| EP | 4234278 A1 | 8/2023 | |
| JP | 2005053248 A | 3/2005 | |
| JP | 2017001440 A | 1/2017 | |
| WO | 2011036061 A1 | 3/2011 | |

OTHER PUBLICATIONS

English machine translation of EP1063071A2. (Year: 2000).*
Extended Search Report issued on Apr. 11, 2025, in corresponding European Application No. 24214393.1, 6 pages.

* cited by examiner

*Primary Examiner* — Robert C Dye
(74) *Attorney, Agent, or Firm* — Maier & Maier, PLLC

(57) ABSTRACT

A tire includes a pattern region on an outer surface of a sidewall of the tire, the pattern region being visually recognizable as being different from a region other than the pattern region in the outer surface of the side wall. The pattern region includes a plurality of projections, each of which includes a bottom surface, a leading end, and a barrel. The barrel includes a bulging portion having a transverse cross section with an equivalent circle diameter that is larger than an equivalent circle diameter of the bottom surface and is the largest in the projection, a bottom surface side barrel portion having a transverse cross section that gradually decreases in area from the bulging portion toward the bottom surface, and a leading end side barrel portion having a transverse cross section that gradually decreases in area from the bulging portion toward the leading end.

12 Claims, 7 Drawing Sheets

TIRE

CROSS-REFERENCE TO RELATED APPLICATIONS

This application is based on and claims the benefit of priority from Japanese Patent Application No. 2023-207197, filed on 7 Dec. 2023, the content of which is incorporated herein by reference.

FIELD

The present invention relates to a tire having, on a part of an outer surface of a sidewall, a pattern region for displaying, for example, a mark, a pattern, and the like.

BACKGROUND

There is a known tire having, on a part of a sidewall, a pattern region in which a large number of fine projections are aggregated (for example, Japanese Unexamined Patent Application, Publication No. 2017-1440). Such a pattern region, in which incident light is repeatedly reflected between the projections, has a light-absorbing effect, and consequently, the pattern region is visually recognized to be blacker than the outer surface of the sidewall around the pattern region, whereby the contrast is enhanced. Provision of this type of pattern region contributes to improving the design effect and appearance of the tire.

SUMMARY

The high contrast obtained by a large number of projections has an advantage that it is less susceptible to changes due to aging than contrast obtained by other means such as painting or the like, and its effect is exerted over a long period of time. Therefore, there is a demand for formation of a pattern region including projections, having a higher black color intensity and a higher contrast than the known art, and contributing to further improvement of the design effect and the appearance.

It is an object of the present invention to provide a tire having a higher black color intensity and a higher contrast than the known art.

A tire according to an embodiment of the present invention includes a pattern region on an outer surface of a sidewall of the tire, the pattern region being visually recognizable as being different from a region other than the pattern region in the outer surface of the sidewall. The pattern region includes a plurality of projections projecting from a surface of the pattern region, and each of the plurality of projections includes: a bottom surface integrated with the surface of the pattern region; a leading end farthest from the bottom surface; and a barrel connecting the bottom surface and the leading end. The barrel includes: a bulging portion provided between the bottom surface and the leading end and having a transverse cross section with an equivalent circle diameter that is larger than an equivalent circle diameter of the bottom surface and is largest in the projection; a bottom surface side barrel portion provided from the bulging portion to the bottom surface and having a transverse cross section that gradually decreases in area from the bulging portion toward the bottom surface; and a leading end side barrel portion provided from the bulging portion to the leading end and having a transverse cross section that gradually decreases in area from the bulging portion toward the leading end.

The present invention provides a tire having a higher black color intensity and a higher contrast than the known art.

DETAILED DESCRIPTION OF THE EMBODIMENTS

An embodiment of the present invention will be described below with reference to the drawings. It should be noted that the word "substantially" used in the present specification specifies not only the state of interest in the strict sense, but also a state that is approximate to the state of interest and is within a range where the functions and effects of the state of interest can be achieved.

Figure 1:
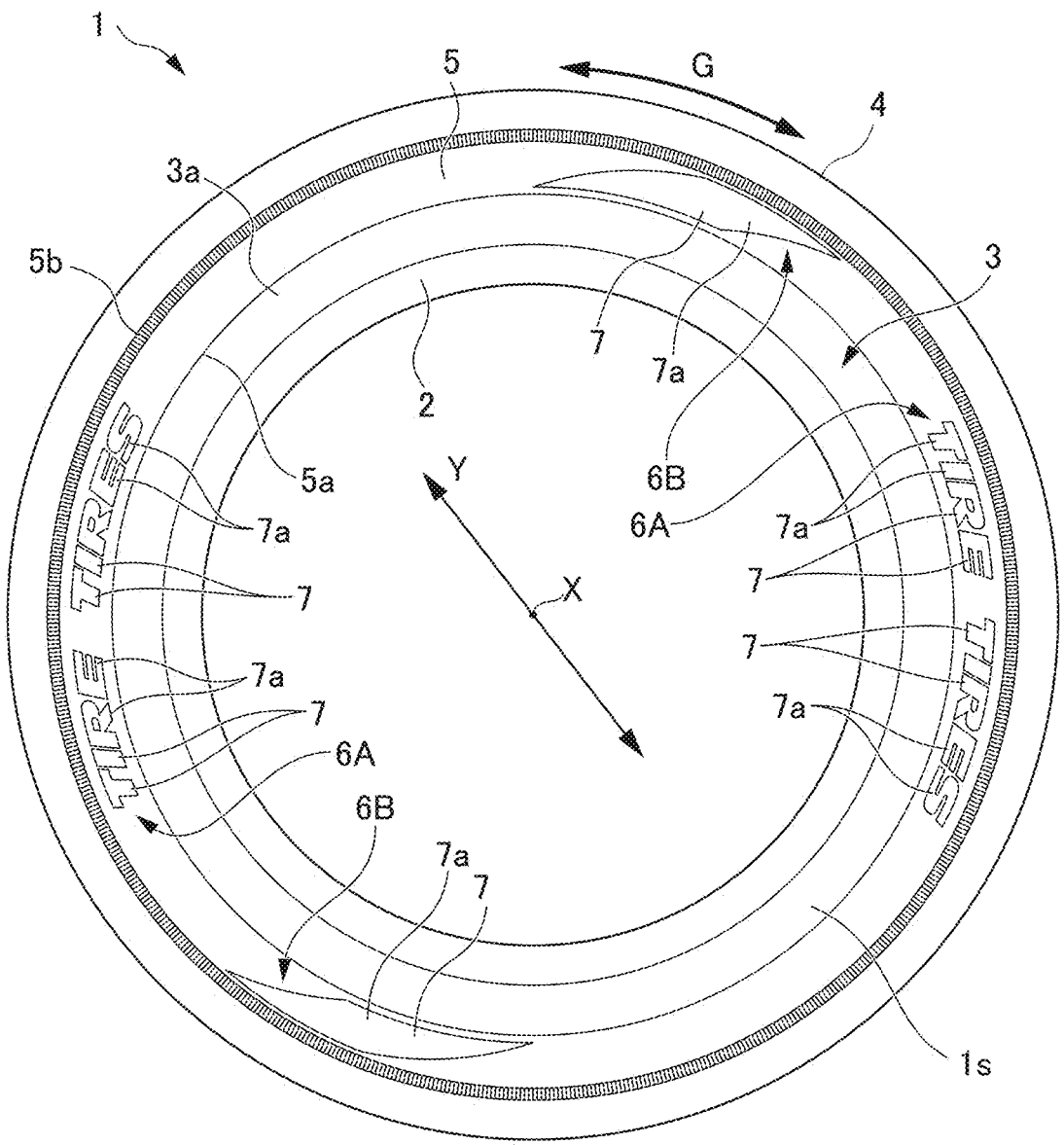
FIG. 1 is a side view of a tire according to an embodiment.

FIG. 1 is a side view of a tire 1 according to the embodiment. The tire 1 is a so-called pneumatic tire that has an inner cavity filled with air at a predetermined pressure. The tire 1 of the embodiment is a pneumatic tire for passenger cars including light automobiles, SUVs, and the like. The configuration of the tire 1 of the embodiment can also be applied to pneumatic tires for other types of vehicles such as light trucks, trucks, and buses.

First, with reference to FIG. 1, an overview of a configuration mainly related to a side surface of the tire 1 will be described. FIG. 1 is a side view of the tire 1 viewed in the direction of a tire rotation axis X. The following description will be provided by referring to a tire axial direction, a tire circumferential direction, and a tire radial direction, which are as follows. The tire axial direction refers to a direction in which the tire rotation axis X extends, and corresponds to a front-back direction of the page of FIG. 1. The tire axial direction coincides with the left-right direction when the tire 1 is viewed in the tire radial direction, and therefore, the tire axial direction may be referred to as the left-right direction. The tire circumferential direction can be represented by an arc line centered on the tire rotation axis X, is a direction along the rotation direction of the tire 1, and is indicated by the arrow G in FIG. 1. The tire radial direction is a direction perpendicular to the tire rotation axis X, and is arbitrarily indicated by the arrow Y in FIG. 1.

As illustrated in FIG. 1, the tire 1 includes beads 2, sidewalls 3 that continue from the beads 2 and extend outward in the tire radial direction away from the tire rotation axis X, and a tread 4. One bead 2 and one sidewall 3 are provided on one side 1s of tire 1 illustrated in FIG. 1, and one bead 2 and one sidewall 3 are provided on the other side of the tire 1 spaced apart in the tire axial direction from the side 1s and not illustrated in FIG. 1. That is, the tire 1 includes the left and right beads 2 in pairs and the left and right sidewalls 3 in pairs. The tread 4 is disposed between the outer sides in the tire radial direction of the left and right sidewalls 3. The outer peripheral surface of the tread 4 includes a tread surface that contacts with a road surface.

The tire 1 is mainly composed of a plurality of types of rubbers respectively constituting the beads 2, the sidewalls 3, and the tread 4. A carcass ply that constitutes the skeleton of the tire 1 is disposed on an inner cavity-facing side of the rubber constituting the entire tire 1, and an inner liner that maintains an air pressure is disposed on an inner cavity-facing side of the carcass ply. An annular reinforcing belt is embedded in the rubber constituting the tread 4. The carcass ply, the inner liner, and the reinforcing belt are not illustrated. In addition to the foregoing components, various components are included as necessary in consideration of the function of the tire 1.

As illustrated in FIG. 1, the sidewall 3 has an outer surface 3a and an annular decorative region 5 extending on the outer surface 3a over the entire circumference in the tire circumferential direction. The decorative region 5 has a constant width and is defined between an inner arc line 5a and an outer arc line 5b. The inner arc line 5a is located inward in the tire radial direction and close to the tire rotation axis X in the tire radial direction, and the outer arc line 5b is located outward in the tire radial direction with respect to the inner arc line 5a. Each of the inner arc line 5a and the outer arc line 5b may be a line formed as a concavity, a convexity, or a step on the outer surface 3a of the sidewall 3, or may be a virtual line that does not actually exist.

On the outer surface 3a of the sidewall 3, the position of the decorative region 5 may be outside in the tire radial direction with respect to the position of a tire maximum width, or may be at a location including the position of the tire maximum width. The position of the tire maximum width refers to a position at which a length in the tire axial direction is maximized between the outer surfaces 3a of the left and right sidewalls 3.

The tire 1 includes pattern regions 7 on parts of the outer surface 3a of the sidewall 3. Each pattern region 7 is visually recognizable as being different from a region other than the part where the pattern region 7 is provided. Each pattern region 7 is provided on a sidewall rubber that is a black rubber member constituting the outer surface 3a of the sidewall 3.

As illustrated in FIG. 1, mark portions 6A are provided on the annular decorative region 5 at two positions opposite to each other across the tire rotation axis X. Each mark portion 6A includes a plurality of characters arranged in the tire circumferential direction. By means of the plurality of characters, at least one of a manufacturer name, a product name, a brand mark, or the like is displayed. Each character may be bordered with a concave or convex line, or the entirety of each character may be formed of a concavity or convexity. For example, the characters of the mark portions 6A are provided as the pattern regions 7 of the embodiment.

As illustrated in FIG. 1, motif portions 6B are provided on the annular decorative region 5 at two positions each of which is sandwiched between the two mark portions 6A in the circumferential direction. Each motif portion 6B includes a motif like a parallelogram curved along the annular decorative region 5. For example, the motifs of the motif portions 6B are also provided as the pattern regions 7 of the embodiment.

It should be noted that the shapes of the pattern regions 7 are not limited to the foregoing shapes, and various shapes may be adopted, examples of which include an arbitrary shape, shapes delineating the above-mentioned manufacturer name, product name, brand mark, etc., and shapes delineating other numerals, characters, etc.

Each of the pattern regions 7 of the embodiment has a surface 7a extending along the profile of the sidewall 3. Each surface 7a has a plurality of projections 20 (to be described later) formed thereon. Due to the plurality of projections 20, each pattern region 7 is visually recognizable as being different from a region other than the pattern region 7.

Figure 2:
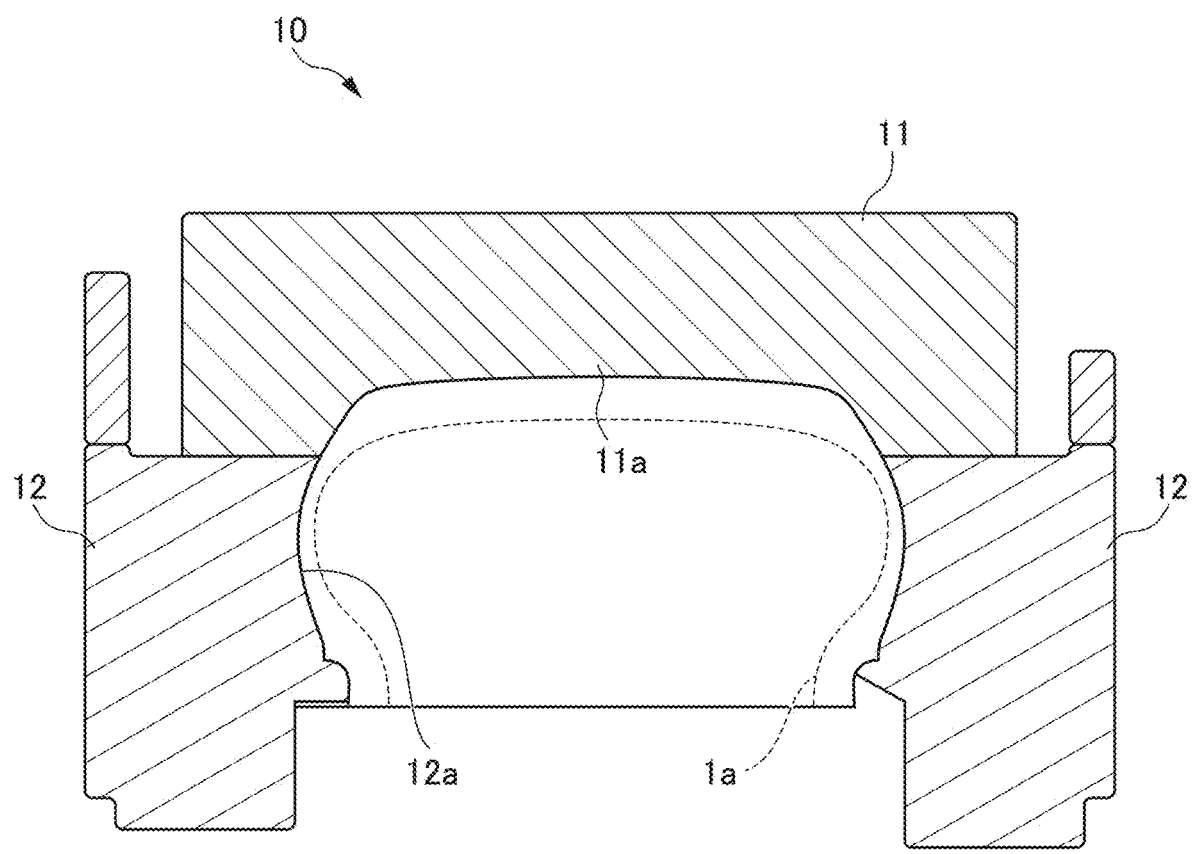
FIG. 2 is a cross-sectional view illustrating an example of a mold for vulcanization molding the tire according to the embodiment.

FIG. 2 illustrates an example of a tire mold for vulcanization molding the tire 1 of the embodiment. FIG. 2 is a meridian sectional view of the tire mold 10, taken along the axial direction of the tire 1 to be molded.

The tire mold 10 illustrated in FIG. 2 includes a plurality of sectors 11 arranged circumferentially along the outer circumference of the tire 1, a pair of side plates 12 disposed at both axial sides of an annular body formed by the plurality of sectors 11 combined with each other, and a pair of bead rings (not shown). At the time of vulcanization molding, an unvulcanized tire 1a to be molded into the tire 1 is set inside the tire mold 10, as indicated by the broken line in FIG. 2. The assembly of the sectors 11, the side plates 12, and the bead rings constitutes the mold for molding the tire 1, and the entire outer surface of the tire 1 is molded by the inner surface of the mold, namely, the inner surfaces 11a of the sectors 11, the inner surfaces 12a of the side plates 12, and the inner surfaces of the bead rings. During vulcanization molding, a bladder (not shown) that presses the unvulcanized tire 1a against the inner surface of the tire mold 10 is disposed inside the unvulcanized tire 1a. The plurality of sectors 11 mainly play a role in forming the tread 4, and the pair of side plates 12 mainly play a role in forming the sidewalls 3. The pair of bead rings play a role in forming the beads 2, and the bladder plays a role in forming the entire inner surface of the tire 1.

In the tire mold 10, the unvulcanized tire 1a is vulcanized so that the rubbers constituting the entire tire 1 are shaped, and the plurality of projections 20 described below are formed in the pattern regions 7 described above.

Figure 3:
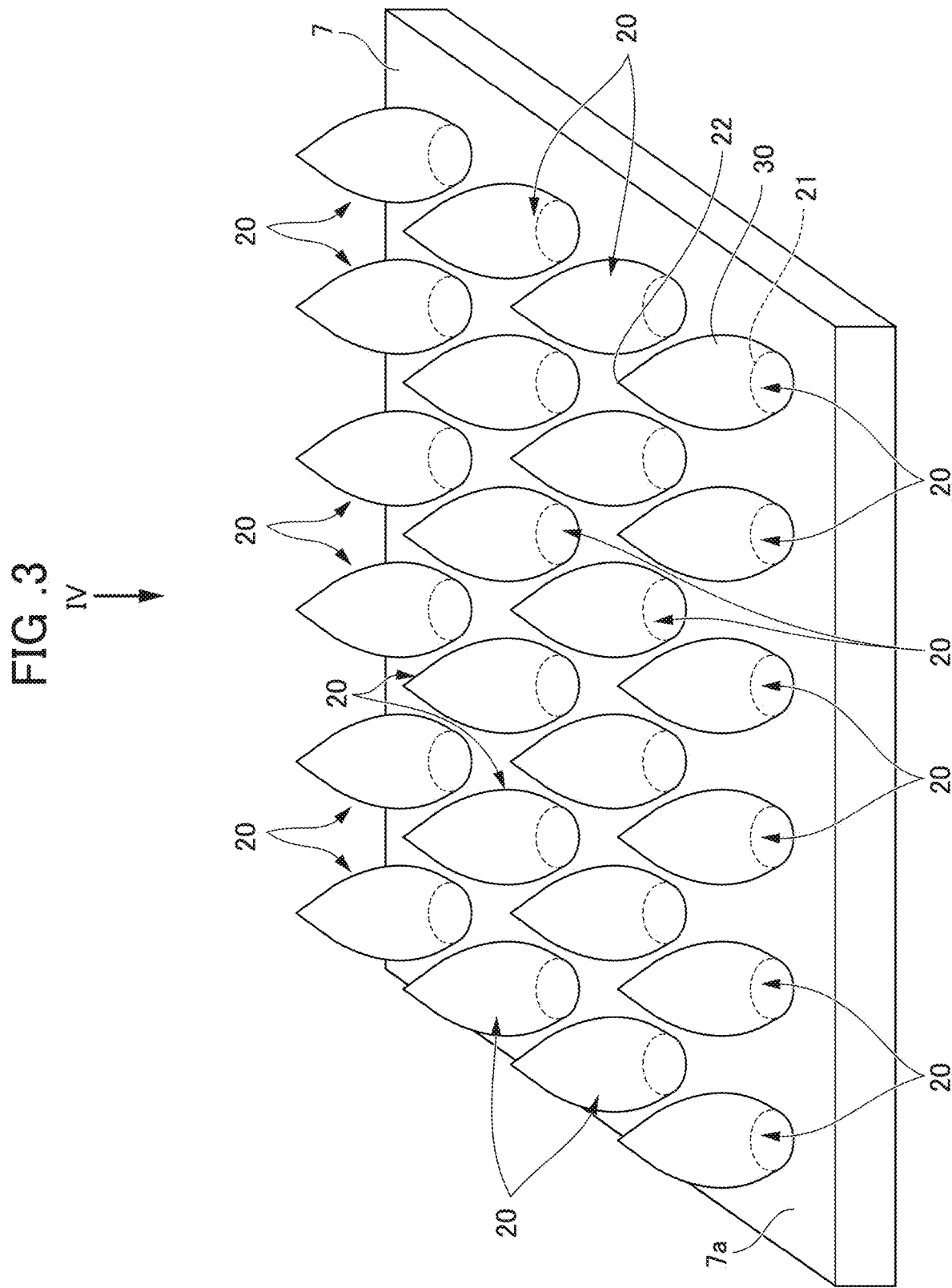
FIG. 3 is a perspective view illustrating a state in which a plurality of projections are arranged in a pattern region of the tire according to the embodiment.
Figure 4:
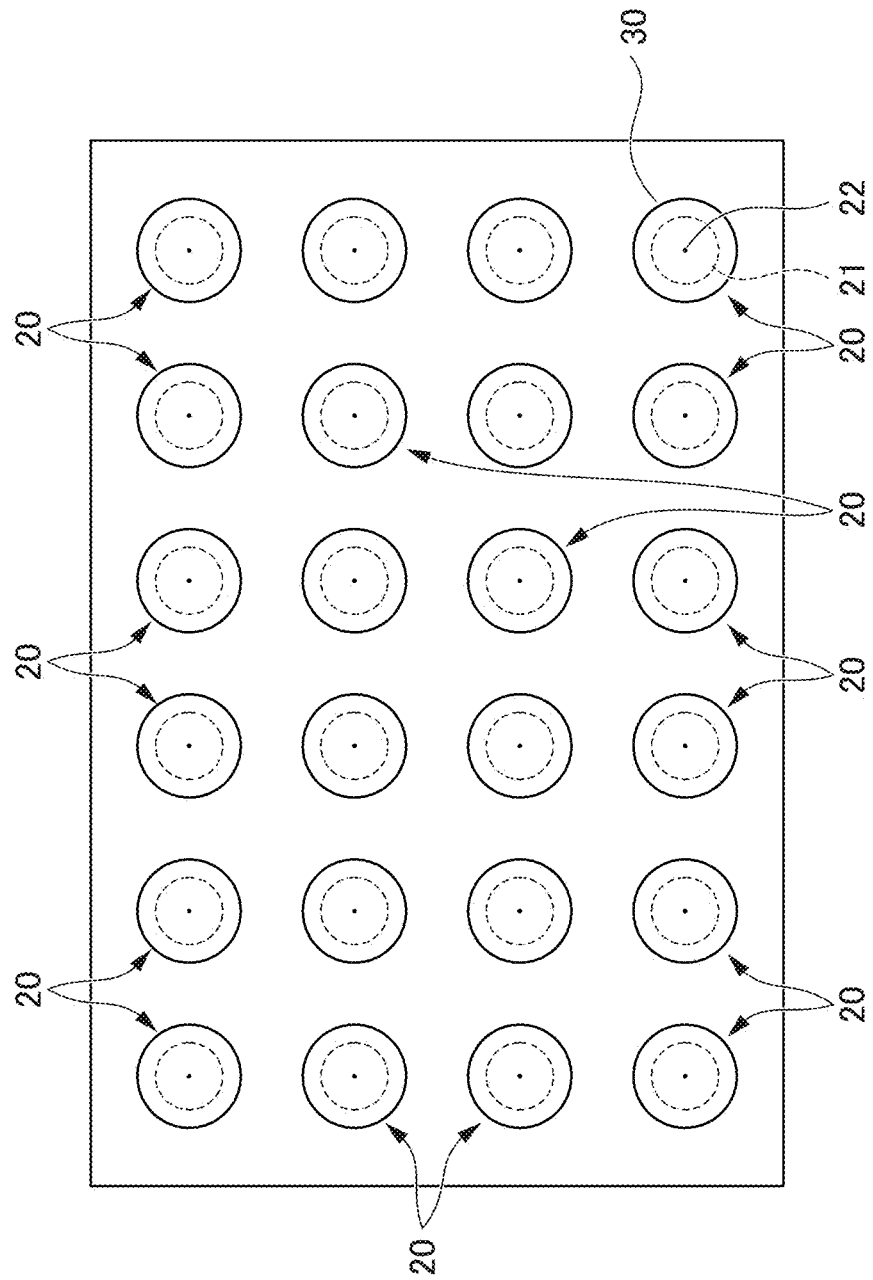
FIG. 4 illustrates the plurality of projections viewed along the arrow IV in FIG. 3.

FIGS. 3 and 4 illustrate the plurality of projections 20 arranged in the pattern region 7. Specifically, FIG. 3 is a perspective view of the projections 20, and FIG. 4 is a plan view and illustrates the projections 20 viewed along the arrow IV in FIG. 3. The plurality of projections 20 are disposed on the surface 7a of each pattern region 7 so that the entirety of the pattern region 7 is filled with the projections 20. Hereinafter, the surface 7a of the pattern region 7 may be referred to as the pattern region surface 7a.

Figure 5:
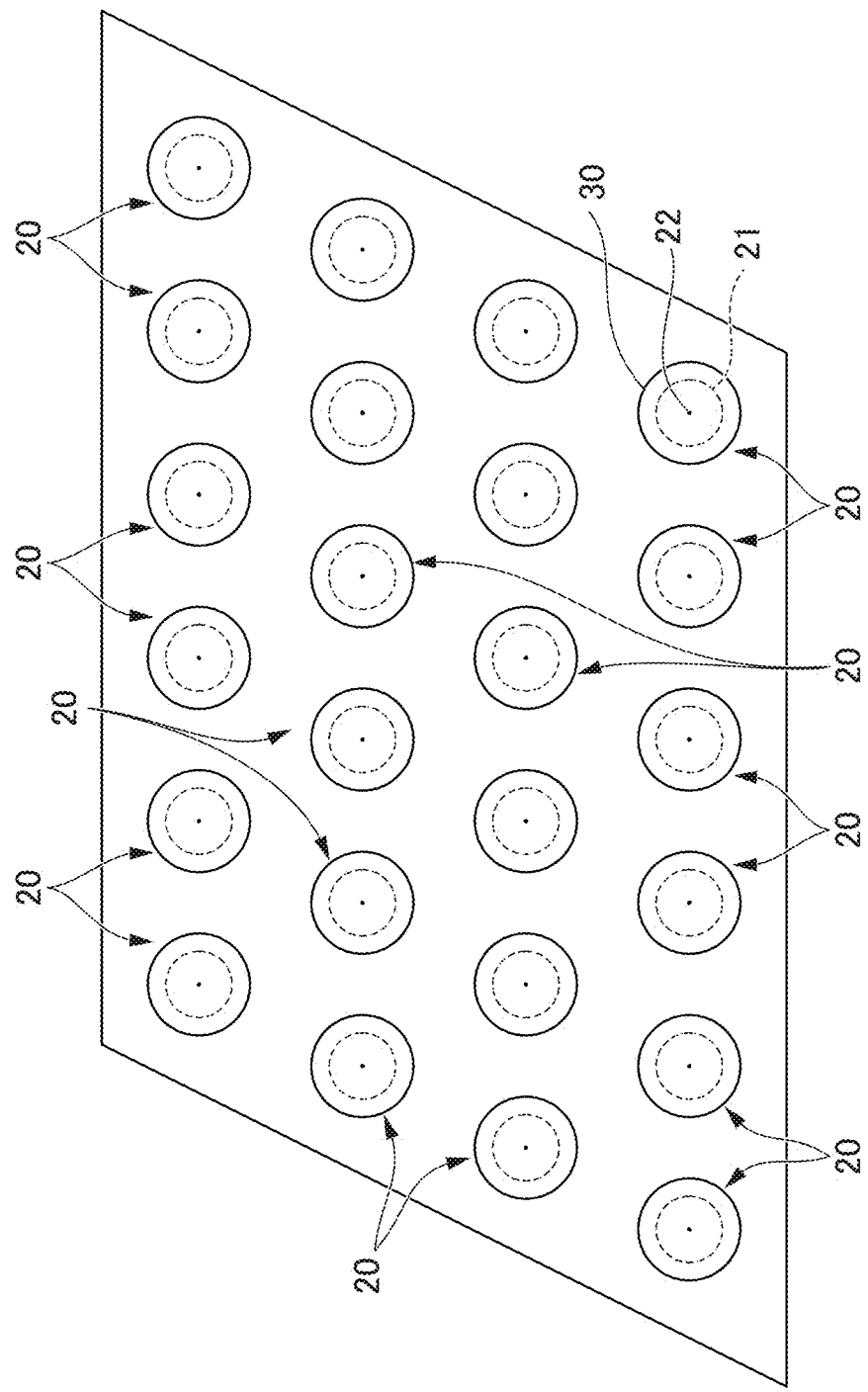
FIG. 5 is a plan view illustrating another example of arrangement of a plurality of projections in the pattern region.

As illustrated in FIG. 4, the plurality of projections 20 are arranged in rows and lines on the pattern region surface 7a. In FIG. 4, the plurality of projections 20 are linearly aligned in lateral rows in the left-right direction and vertical lines in the up-down direction at equal pitches. For example, a pitch of the straight lines and rows is 2.0 times or more and 3.0 times or less the equivalent circle diameter of the bottom surface 21. The arrangement of the plurality of projections 20 illustrated in FIG. 4 is a non-limiting-example. For example, the plurality of projections 20 may be arranged in a staggered manner as illustrated in FIG. 5. Specifically, in FIG. 5, the projections 20 are aligned in a plurality of lateral straight lines arranged at equal pitches in the up-down direction such that between a pair of the lateral lines adjacent to each other in the up-down direction, each of the projections 20 in one lateral line is positioned between the projections 20 in the other lateral line.

Figure 6:
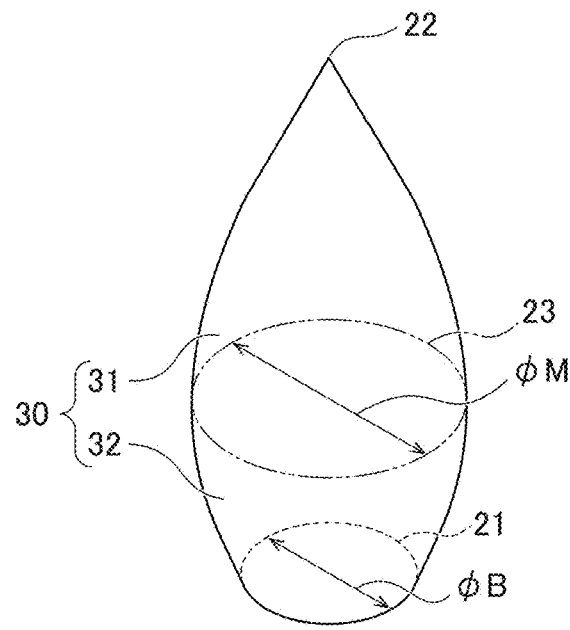
FIG. 6 is a perspective view of the projection according to the embodiment.
Figure 7:
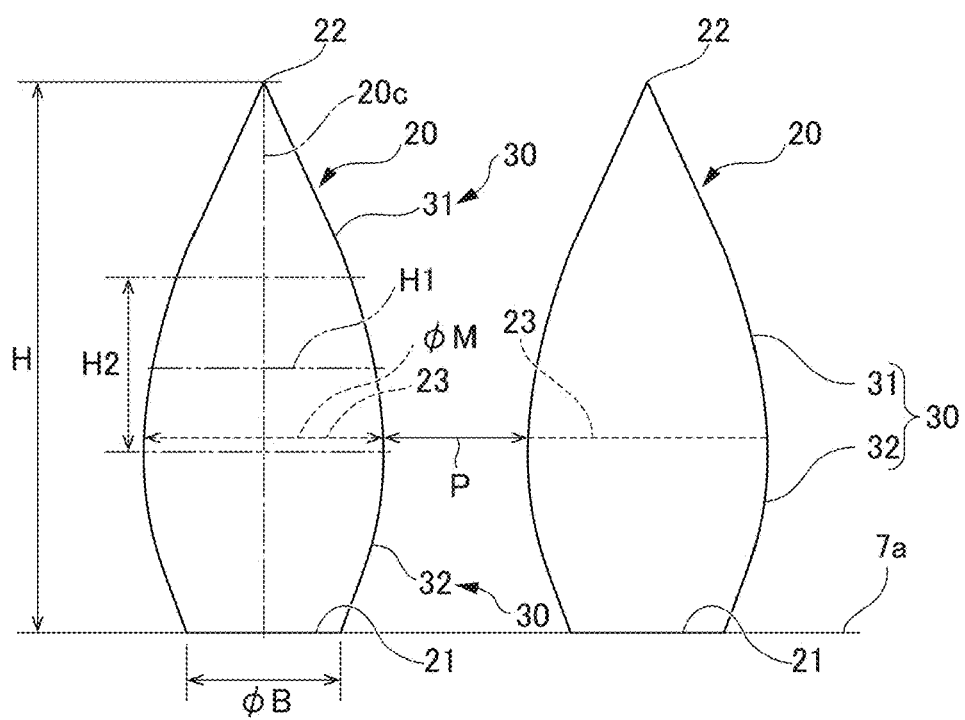
FIG. 7 is a side view of a pair of adjacent projections according to the embodiment.

Each of the projections 20 of the embodiment is a minute projection that projects from the pattern region surface 7a. FIG. 6 is a perspective view of one projection 20, and FIG. 7 is a side view of a pair of projections 20 adjacent to each other on the pattern region surface 7a. As illustrated in FIGS. 6 and 7, each projection 20 includes a bottom surface 21, a leading end 22 farthest from the bottom surface 21, and a barrel 30 connecting the bottom surface 21 and the leading end 22. Each projection 20 of the embodiment has a generally acorn-shaped appearance because of the shape of the barrel 30. The bottom surface 21 is a virtual surface that is integrated and coplanar with the pattern region surface 7a.

The bottom surface 21 of the projection 20 of the embodiment has a substantially perfect circular shape. As illustrated in FIG. 7, each projection 20 has a center axis 20c that connects the center of the bottom surface 21 and the leading end 22 and that is substantially perpendicular to the pattern region surface 7a and the bottom surface 21. Therefore, the projection 20 stands upright with respect to the pattern region surface 7a. As shown in FIG. 7, the distance along the center axis 20c from the bottom surface 21 to the leading end 22 is the height H of the projection 20, and the height H is the shortest distance from the bottom surface 21 to the leading end 22. The projection 20 has transverse cross sections with a substantially perfect circular shape over the entire length in the height direction from the bottom surface 21 to the leading end 22. The transverse cross section as used herein refers to a plane substantially perpendicular to the center axis 20c, and is substantially parallel to the pattern region surface 7a.

The barrel 30 of the projection 20 of the embodiment has a bulging portion 23 in the middle in the height direction. The bulging portion 23 has a transverse cross section that is larger in equivalent circle diameter than the bottom surface 21 and is the largest in equivalent circle diameter in the projection 20. In other words, the bulging portion 23 is a portion of the barrel 30 that bulges most in the lateral direction. Since the projection 20 of the embodiment has, in its entirety, transverse cross sections with a substantially perfect circular shape, the equivalent circle diameter is the diameter. In the present disclosure, the transverse cross section of the projections 20 is not limited to the perfect circle shape, and may be, for example, an elliptical shape, a triangular shape, a polygonal shape, or the like, and the equivalent circle diameter is adopted to the transverse cross sections of these shapes.

The barrel 30 of the projection 20 of the embodiment includes a bottom surface side barrel portion 32 and a leading end side barrel portion 31 with the bulging portion 23 interposed therebetween as a boundary. In FIGS. 6 and 7, the bottom surface side barrel portion 32 is a portion below the bulging portion 23, that is, a portion from the bulging portion 23 to the bottom surface 21. The transverse cross section of the bottom surface side barrel portion 32 gradually decreases in area from the bulging portion 23 toward the bottom surface 21. In FIGS. 6 and 7, the leading end side barrel portion 31 is a portion above the bulging portion 23, that is, a portion from the bulging portion 23 to the leading end 22. The transverse cross section of the leading end side barrel portion 31 gradually decreases in area from the bulging portion 23 toward the leading end 22. That is, the bottom surface side barrel portion 32 has a shape that narrows toward the bottom surface 21, and the leading end side barrel portion 31 has a shape that narrows toward the leading end 22.

The leading end side barrel portion 31 converges in the direction from the bulging portion 23 toward the leading end 22, and the leading end 22 of the projection 20 has a shape that tapers to a sharp point. The shape of the leading end 22 is not limited to this, and may have a hemispherical shape, for example. Alternatively, the leading end 22 may have the tip with a flat portion which would result from cutting substantially parallel to the transverse cross section.

As illustrated in FIG. 3, the plurality of projections 20 of the embodiment have a substantially uniform shape and size. The dimensions specifying the shape and the like of the projections 20 of the embodiment are not particularly limited, and may be within the following preferred ranges, for example.

The height of the projection 20 is preferably, for example, 2.0 times or more and 3.0 times or less the diameter (denoted by ϕB in FIGS. 6 and 7) of the bottom surface 21. Specifically, the height of the projection 20 is preferably 0.2 mm or greater and 0.8 mm or less.

The diameter (denoted by ϕM in FIGS. 6 and 7) of the transverse cross section of the bulging portion 23 of the projection 20 of the embodiment is preferably 120% or more and 150% or less of the diameter of the bottom surface 21. Specifically, the diameter of the transverse cross section of the bottom surface 21 is preferably, for example, 0.1 mm or greater and 0.4 mm or less, and the diameter of the transverse cross section of the bulging portion 23 is preferably, for example, 0.2 mm or greater and 0.5 mm or less.

As illustrated in FIG. 7, the center of the projection 20 of the embodiment in the height direction is denoted by H1, and the height position of the bulging portion 23 in terms of the height H of the projection 20 is preferably within a range denoted by H2, which is between a height position closer to the bottom surface 21 by 15% of the height of the projection 20 from the center H1 and a height position closer to the leading end 22 by 15% of the height of the projection 20 from the center H1.

The plurality of projections 20 on the pattern region surface 7a are preferably arranged at a density of two or more projections 20 per 1 mm$^2$. Furthermore, as illustrated in FIG. 7, it is preferable that the interval P between mutually proximate portions of the adjacent projections 20 is, for example, 0.5 mm or less.

The plurality of projections 20 of the embodiment can be formed on the pattern region surface 7a by using the tire mold 10 described above, for example. To form the plurality of projections 20 by the tire mold 10, a plurality of concavities corresponding to the projections 20 and capable of molding the projections 20 are formed in the inner surface 12a, which is a tire molding surface of the side plate 12 and is for forming the pattern regions 7.

In this case, although any method can be employed to form the plurality of concavities, laser processing in which portions of the inner surface 12a of the side plate 12 are removed by irradiating the inner surface 12a with a laser beam is suitable as the method of forming the concavities. As the laser processing, a removal processing using a pulse fiber laser can be adopted, for example. Suitable conditions of the laser processing are as follows: a center wavelength is 1080 nm, an average output is 100 W or greater and 300 W or less, and a laser spot diameter is about 0.05 mm.

In the case of using the laser processing, it is possible to form in the tire mold 10 the concavities by which the projections 20 of the embodiment can be molded by adjusting an output for each pulse and adjusting an irradiation angle of the laser beam.

In the case where the projections 20 are molded using the tire mold 10, since the projections 20 of the embodiment have a so-called undercut shape, there may be a concern that the projections 20 cannot be removed from the concavities in which the projections 20 have been molded, at the time of releasing the tire from the tire mold 10. In that case, setting the diameter of the bulging portion 23 to, for example, about 150% or less of the diameter of the bottom surface 21 makes it possible to remove the projections 20 without trouble, with the help of elastic deformation of the rubber. Thus, it is possible to avoid a situation in which time and manpower are required to, for example, divide the tire mold 10 in order to enable removal of the projections 20 from the mold.

Since the tire 1 of the embodiment has the plurality of projections 20 arranged in the pattern regions 7 as described above, light incident on each pattern region 7 is mainly incident on the pattern region surface 7a and the barrels 30 of the projections 20, and is reflected by their surfaces. The reflected light is reflected again by the surrounding projections 20 and the pattern region surface 7a, whereby such reflection repeatedly occurs between the plurality of projections 20 and between the pattern region surface 7a and the projections 20. As a result, the light incident on the pattern region 7 is gradually attenuated and absorbed. The pattern region 7 having the configuration described above is visually recognized as being blacker than the outer surface 3a of the sidewall 3 that reflects ambient light around the pattern region 7.

Figure 8:
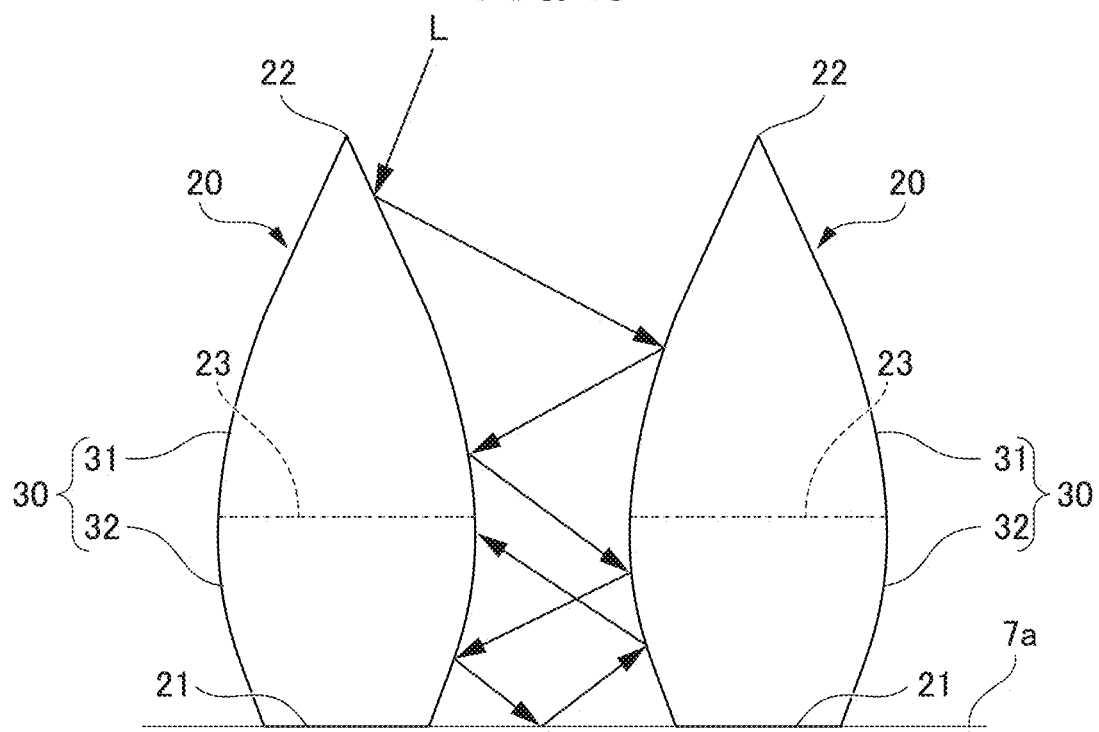
FIG. 8 is a side view of a pair of adjacent projections according to the embodiment, and schematically illustrates a light-absorbing effect by the projections.

FIG. 8 schematically illustrates an example of a light-absorbing effect according to the embodiment. When the light denoted by L in FIG. 8 travels toward the pattern region surface 7a, the light is reflected in a zigzag between the barrels 30 of a pair of adjacent projections 20 before reaching the vicinity of the pattern region surface 7a, and then, is reflected by the pattern region surface 7a. The light reflected by the pattern region surface 7a reaches the bottom surface side barrel portions 32 of the barrels 30 of the projections 20. Here, since the bottom surface side barrel portion 32 narrows toward the bottom surface 21, the light reflected by the bottom surface side barrel portion 32 is likely to travel toward the pattern region surface 7a. Therefore, the light that has reached the pattern region surface 7a is blocked by the bottom surface side barrel portions 32 of the projections 20 to be confined in the pattern region 7, and is less likely to exit to the outside from the pattern region 7, that is, is less likely to be reflected to the outside. As a result, an effect in absorbing light incident on the pattern region 7 is promoted, and a high contrast is achieved due to an increase in the black color intensity.

The embodiment described above exerts the following effects.

(1) The tire 1 according to the embodiment is a tire including a pattern region 7 on an outer surface 3a of a sidewall 3 of the tire 1, the pattern region 7 being visually recognizable as being different from a region other than the pattern region 7 in the outer surface 3a of the sidewall 3, and including a plurality of projections 20 projecting from a surface 7a of the pattern region 7. Each of the plurality of projections 20 includes a bottom surface 21 integrated with the surface 7a of the pattern region 7, a leading end 22 farthest from the bottom surface 21, and a barrel 30 connecting the bottom surface 21 and the leading end 22. The barrel 30 includes: a bulging portion 23 provided between the bottom surface 21 and the leading end 22 and having a transverse cross section with an equivalent circle diameter that is larger than an equivalent circle diameter of the bottom surface 21 and is the largest in the projection 20; a bottom surface side barrel portion 32 provided from the bulging portion 23 to the bottom surface 21 and having a transverse cross section that gradually decreases in area from the bulging portion 23 toward the bottom surface 21; and a leading end side barrel portion 31 provided from the bulging portion 23 to the leading end 22 and having a transverse cross section that gradually decreases in area from the bulging portion 23 toward the leading end 22.

According to the tire 1 of the embodiment, light incident on the pattern region 7, which has the plurality of projections 20 arranged therein, is mainly incident on the pattern region surface 7a and the barrels 30 of the projections 20, and is reflected by their surfaces. The reflected light is reflected again by the surrounding projections 20 and the pattern region surface 7a, and such reflection repeatedly occurs between the plurality of projections 20 and between the pattern region surface 7a and the projections 20. As a result, the light incident on the pattern region 7 is gradually attenuated and absorbed. When the pattern region 7 having this configuration is visually recognized as being blacker than the outer surface 3a of the sidewall 3 that reflects ambient light around the pattern region 7. Since each projection 20 of the embodiment has the bottom surface side barrel portion 32 extending from the bulging portion 23 to the bottom surface 21 and having a shape that narrows toward the bottom surface 21, the light that has once entered the pattern region 7 is confined in the pattern region 7 by the bottom surface side barrel portions 32 and is less likely to exit to the outside, and thus, is less likely to be reflected to the outside. As a result, an effect in absorbing light incident on the pattern region 7 is promoted, and a high contrast is achieved due to the pattern region 7 having a higher black color intensity than the known art.

(2) In the tire 1 according to the embodiment described in (1) above, it is preferable that the equivalent circle diameter of the transverse cross section of the bulging portion 23 is 120% or greater and 150% or less of the equivalent circle diameter of the bottom surface 21.

Due to this feature, the bulging portion 23 having a larger diameter than the bottom surface 21 is reliably formed, and as a result, the light-absorbing effect by the bottom surface side barrel portion 32 is enhanced. Furthermore, as described above, in the case where the projections 20 are molded by the concavities formed in the tire mold 10, the projections 20 can be removed from the tire mold 10 even if they have an undercut shape.

(3) In the tire 1 according to the embodiment described in (1) and (2) above, it is preferable that each projection 20 has a height that is the shortest distance from the bottom surface 21 to the leading end 22, and that the height position of the bulging portion 23 with respect to the height of the projection 20 is located between a height position closer to the bottom surface 21 by 15% of the height of the projection 20 from a center of the projection 20 in a height direction and a height position closer to the leading end 22 by 15% of the height of the projection 20 from the center of the projection 20 in the height direction.

Due to this feature, the height position of the bulging portion 23 of each projection 20 is appropriately set, and the light-absorbing effect by the bottom surface side barrel portions 32 is enhanced.

(4) In the tire 1 according to the embodiment described in (1) to (3) above, it is preferable that the plurality of projections 20 are arranged at a density of two or more projections 20 per 1 $mm^2$ in the pattern region 7.

Due to this feature, a light-absorbing effect is enhanced between the adjacent projections 20, and a high contrast is achieved due to the pattern region 7 having a higher black color intensity than the known art.

(5) In the tire 1 according to the embodiment described in (1) to (4) above, it is preferable that the plurality of projections 20 are arranged at equal intervals in straight lines and rows, and the pitch of the straight lines and rows is 2.0 times or more and 3.0 times or less the equivalent circle diameter of the bottom surface 21.

Due to this feature, a light-absorbing effect is enhanced between the adjacent projections 20, and a high contrast is achieved due to the pattern region 7 having a higher black color intensity than the known art.

(6) In the tire 1 according to the embodiment described in (1) to (5) above, it is preferable that the transverse cross section of each projection 20 has a substantially circular shape.

Due to this feature, light is reflected by each projection 20 radially around the projection 20, and consequently, the reflection of light repeated between the projections 20 is likely to be complicated. Furthermore, an effect in confining light incident on the pattern region 7 in the pattern region 7 is likely to be exerted. For these reasons, the light-absorbing effect is enhanced, and a high contrast is achieved due to the pattern region 7 having a higher black color intensity than the known art.

(7) In the tire 1 according to the embodiment described in (1) to (6) above, it is preferable that the leading end 22 has a shape that tapers to a sharp point.

Due to this feature, light incident on the pattern region 7 is less likely to be reflected by the leading ends of the projections 20, and an amount of light reflected to the outside is reduced as compared with the case where the leading end is not sharply pointed. As a result, a high contrast is achieved in the pattern region 7.

It should be noted that the present invention is not limited to the embodiment described above, and modifications, improvements, and the like within a range in which the object of the present invention can be achieved are also encompassed in the scope of the present invention.

For example, the plurality of projections 20 may be randomly disposed in an irregular arrangement in the pattern region 7, instead of the line and row arrangement illustrated in FIGS. 4 and 5.

Although each projection 20 of the above embodiment stands upright on the pattern region surface 7a, each projection 20 may be tilted while having the center axis 20c tilted with respect to the pattern region surface 7a.

Although the shapes and dimensions of the plurality of projections 20 of the above embodiment are substantially uniform, the shapes and dimensions of the plurality of projections 20 may be non-uniform. For example, the projections 20 may have different heights, the bottom surfaces 21 with different diameters, the bulging portions 23 with different diameters and at different height positions, etc.

What is claimed is:

1. A tire comprising:
a pattern region on an outer surface of a sidewall of the tire, the pattern region being visually recognizable as being different from a region other than the pattern region in the outer surface of the side wall,
the pattern region comprising a plurality of projections projecting from a surface of the pattern region,
each of the plurality of projections comprising: a bottom surface integrated with the surface of the pattern region; a leading end farthest from the bottom surface; and a barrel connecting the bottom surface and the leading end,
the barrel comprising: a bulging portion provided between the bottom surface and the leading end and having a transverse cross section with an equivalent circle diameter that is larger than an equivalent circle diameter of the bottom surface and is largest in the projection; a bottom surface side barrel portion provided from the bulging portion to the bottom surface and having a transverse cross section that gradually decreases in area from the bulging portion toward the bottom surface; and a leading end side barrel portion provided from the bulging portion to the leading end and having a transverse cross section that gradually decreases in area from the bulging portion toward the leading end, wherein the equivalent circle diameter of the transverse cross section of the bulging portion is from 0.2 mm to 0.5 mm,
each projection has a height that is a shortest distance from the bottom surface to the leading end, wherein the height of each projection ranges from 0.2 mm to 0.8 mm.

2. The tire according to claim 1, wherein
the equivalent circle diameter of the transverse cross section of the bulging portion is 120% or greater and 150% or less of the equivalent circle diameter of the bottom surface.

3. The tire according to claim 1, wherein
a height position of the bulging portion, in terms of the height of the projection, is located between a height position closer to the bottom surface by 15% of the height of the projection from a center of the projection in a height direction and a height position closer to the leading end by 15% of the height of the projection from the center of the projection in the height direction.

4. The tire according to claim 1, wherein
the plurality of projections are arranged at a density of two or more projections per 1 $mm^2$ in the pattern region.

5. The tire according to claim 1, wherein
the plurality of projections are arranged at equal intervals in straight lines and rows, and a pitch of the straight lines and rows is 2.0 times or more and 3.0 times or less the equivalent circle diameter of the bottom surface.

6. The tire according to claim 1, wherein
the transverse cross section of each projection has a circular shape.

7. The tire according to claim 1, wherein
the leading end has a shape that tapers to a sharp point.

8. The tire according to claim 2, wherein
a height position of the bulging portion with respect to the height of the projection is located between a height position closer to the bottom surface by 15% of the height of the projection from a center of the projection in a height direction and a height position closer to the leading end by 15% of the height of the projection from the center of the projection in the height direction.

9. The tire according to claim 2, wherein
the plurality of projections are arranged at a density of two or more projections per 1 $mm^2$ in the pattern region.

10. The tire according to claim 2, wherein
the plurality of projections are arranged at equal intervals in straight lines, and a pitch of the straight lines is 2.0 times or more and 3.0 times or less the equivalent circle diameter of the bottom surface.

11. The tire according to claim 2, wherein
the transverse cross section of each projection has a substantially circular shape.

12. The tire according to claim 2, wherein the leading end has a shape that tapers to a sharp point.

* * * * *